United States Patent
D'Amico

(10) Patent No.: US 6,556,616 B2
(45) Date of Patent: Apr. 29, 2003

(54) DATA TERMINAL AND CODING METHOD FOR INCREASED PACKET RELIABILITY IN A FREQUENCY HOPPING SYSTEM

(75) Inventor: Thomas V. D'Amico, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/015,018

(22) Filed: Dec. 11, 2001

(65) Prior Publication Data

US 2002/0067758 A1 Jun. 6, 2002

Related U.S. Application Data

(62) Division of application No. 09/166,745, filed on Oct. 5, 1998.

(51) Int. Cl.[7] .......................... H04B 15/00; H04K 1/00; H04L 27/30

(52) U.S. Cl. ...................... 375/132; 375/340; 375/136; 375/137; 714/52; 714/703; 714/751; 714/752

(58) Field of Search ................................. 375/132, 340, 375/136, 137; 714/52, 703, 751, 752

(56) References Cited

U.S. PATENT DOCUMENTS

| | | | | |
|---|---|---|---|---|
| 4,910,736 A | * | 3/1990 | Tanaka et al. | 714/758 |
| 4,947,484 A | * | 8/1990 | Twitty et al. | 714/776 |
| 5,390,197 A | * | 2/1995 | MacDonald et al. | 714/782 |

* cited by examiner

Primary Examiner—Mohammad H. Ghayour
(74) Attorney, Agent, or Firm—Randi L. Dulaney

(57) ABSTRACT

A technique is used in a data terminal (110, 160) that encodes and decodes a data packet that is transmitted in a link of a frequency hopping system. During encoding, an information portion of the data packet is determined for transmission, a transmit redundancy check code is generated over the information portion and an identifier using a predetermined redundancy check code generator, and the data packet is generated to include the transmit redundancy check code and the information portion, but exclude the identifier. During decoding, the information portion and a received redundancy check code of the received data packet are determined, a calculated redundancy check code is generated over the information portion and the identifier, using the predetermined redundancy check code generator, and the information portion is rejected when the received redundancy check code does not match the calculated redundancy check code.

13 Claims, 3 Drawing Sheets

DATA TERMINAL AND CODING METHOD FOR INCREASED PACKET RELIABILITY IN A FREQUENCY HOPPING SYSTEM

CROSS REFERENCE TO RELATED APPLICATIONS

This application is a divisional of pending U.S. application Ser. No. 09/166,745, filed Oct. 5, 1998, and assigned to Motorola, Inc.

FIELD OF THE INVENTION

This invention relates in general to techniques for communicating data in a frequency hopping system, and in particular to a coding technique that improves throughput reliability in such a system.

BACKGROUND OF THE INVENTION

In frequency hopping systems, two data terminal devices communicate information over a link that uses electromagnetic radiation, typically radio waves, to carry the information. The information is sent as messages or calls that are formed from one or more data packets. The electromagnetic radiation has a carrier frequency that undergoes discrete frequency changes. During the time the link is at one frequency, a data packet is sent from a transmitting terminal to a receiving terminal. This is also referred to as a hop. The discrete frequency changes are predetermined in time and frequency by the two data terminal devices, but may appear to be random to an observer or to a third data terminal device. By predetermined, it is meant that the receiving data terminal contains information that allows the receiving data terminal to change to the next carrier frequency of the transmitting data terminal essentially at the time the change of carrier frequency occurs, without receiving successive frequency change information from the transmitting data terminal. Typically, a pseudorandom value generator is used to generate a pattern of values that change the carrier frequency. The pattern of the pseudorandom values is predictable from a relatively small set of defining values that are communicated or predetermined within the receiving data terminal.

Of the two data terminal devices, one can be a fixed terminal, such as a base station in a cellular paging or cellular telephone system, and the other a mobile or portable data terminal. In such systems, the fixed terminal can be one of the two terminals for a plurality of links. In other systems, the links are primarily or solely between independent pairs of terminals.

In some systems, particularly those having fixed terminals in a cellular pattern, the frequency changes for one link are coordinated with the frequency changes for other links such that interference between pairs of links is minimized. However, in other systems, there is no such coordination, and interference is controlled by the relative signal strengths of the links that have a common frequency. The relative signal strengths are typically substantially different (because of relative distances) and there typically exists a low probability of simultaneous use of a common frequency. Such is the case in the instrument, scientific, and measurement (ISM) frequency band in the United States, for which the Federal Communications Commission requires that equipment using links in the ISM band not employ frequency coordination between terminals having different links.

A problem that arises in an uncoordinated system, and that also arises less frequently in a coordinated system, is interference between two links at times when the links use a common frequency. When an interfering link is substantially weaker than the interfered link at the interfered data terminal, the effect of the interference is typically a few or no bit errors during the hop. To improve performance caused by weak interference and by other types of signal disturbances such as ignition noise or fading, there is typically included in each hop or packet a conventional forward error correction code that corrects a predetermined maximum number of errors. When a few bit errors occur during a hop, they are then corrected. This avoids retransmission of the data packet when a data message is being communicated between the data terminals (when the data terminals are, for instance, alphanumeric data terminals). However, when the number of errors is too large, received errors are not correctable by the forward error correction code in the packet. In such a case, the errors may still be detected by a redundancy check code that is included with each hop or packet. The redundancy check code can determine that there are errors in the packet, but does not determine the location of the errors.

It will be appreciated that in these circumstances, when a data packet is received from an interfering link that is overpowering, the information in the interfered data packet can be completely replaced by the information in the interfering data packet and no errors will be detected in the received data packet. In a real time system, such as mobile telephony, an errored packet would normally be discarded and error mitigation could be applied to replace the discarded packet, using information obtained from preceding and succeeding packets. However, if the packet is completely replaced without any indication of uncorrectable errors, the result is an unacceptable burst of a wrong conversation.

Thus, what is needed is a technique for detecting a strong interfering link in a frequency hopping system that overpowers the non-interfering link and replaces a desired data packet with an interfering data packet that passes error checking and is accepted as the desired data packet. The technique should not add significant length to the data packet.

DESCRIPTION OF A PREFERRED EMBODIMENT

Figure 1:
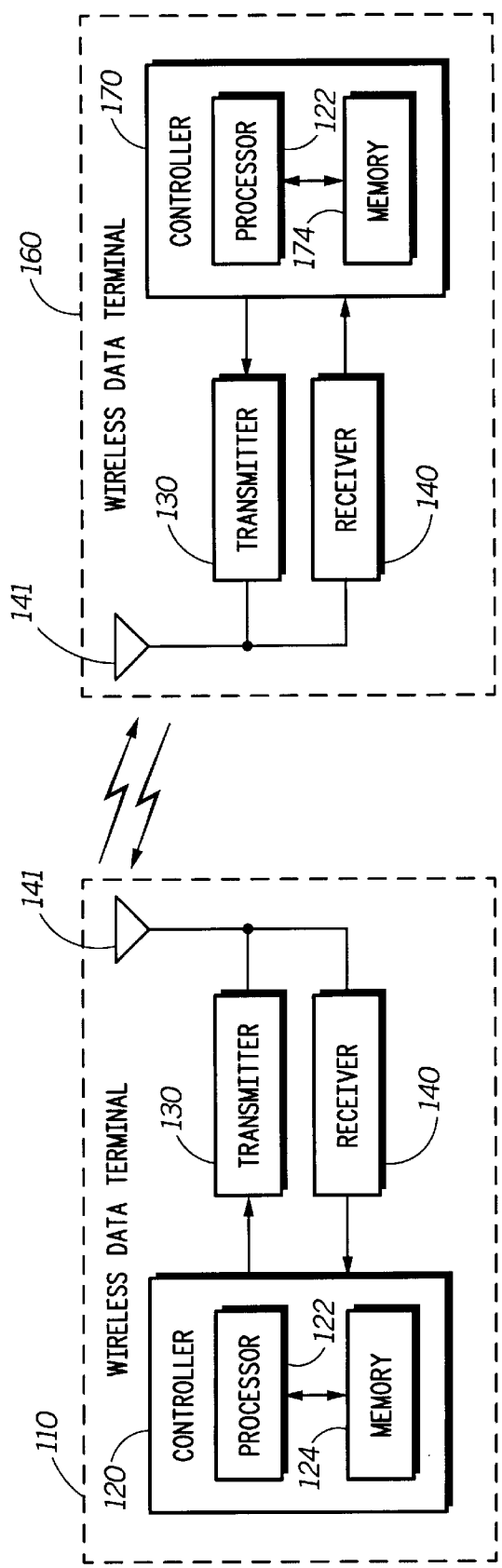
FIG. 1 shows a block diagram of two data terminals forming a link in a frequency hopping system, in accordance with a preferred embodiment of the present invention.

Referring to FIG. 1, a first data terminal 110, and a second data terminal 160 are shown, in accordance with the preferred embodiment of the present invention. The first data terminal 110 comprises a controller 120, a transmitter 130, a receiver 140, and an antenna 141. The second data terminal 160 comprises a controller 170, the same model transmitter 130, the same model receiver 140, and the same model antenna 141. The first and second data terminals 110, 160 are preferably modified PAGEWRITER 2000™ model pagers made by Motorola, Inc., Schaumburg, Ill. The controller 120 comprises a processor 122 and a program memory 124. The controller 170 comprises the processor 122 and a program memory 174. The processor 122 and program memories 124, 174 are conventional parts except that the program memory 124 is programmed with unique program segments that control the processor 122 to perform link setup and to encode data packets, and the program memory 174 is programmed with unique program instruction segments that control the processor 122 to perform link set up and to decode data packets in accordance with the preferred embodiment of the present invention, as detailed herein below, with reference to FIG. 2.

It will be appreciated that the first and second data terminals 110, 160 are representative of a large class of data terminals, including personal messaging devices, alternatively called selective call radios, subscriber units, and personal messaging units, that can receive and transmit information messages, and that could be used alternatively in accordance with the present invention. The first and second data terminals 110, 160 also represent wireless modems. The transmissions by the first and second terminals 110, 160 can be by radio or other electromagnetic radiation, such as infrared light.

It will be appreciated that one or both of the first and second data terminals 110, 160 could be representative of a class of fixed communication equipment used in a variety of radio communication systems, such as the controller and base station of a paging or cellular telephone system, or a desktop paging terminal, or a base unit for a home remote telephone set. It will be further appreciated that although the data terminal 110 has been described as having a unique set of program instructions in memory 124 for encoding data packets, and the data terminal 160 has been described as having a unique set of program instructions in memory 174 for decoding data packets, in accordance with the preferred embodiment of the present invention, both data terminals 110, 160 can have both sets of program instructions, thereby providing bidirectional improvement of data packet reliability.

Figure 2:
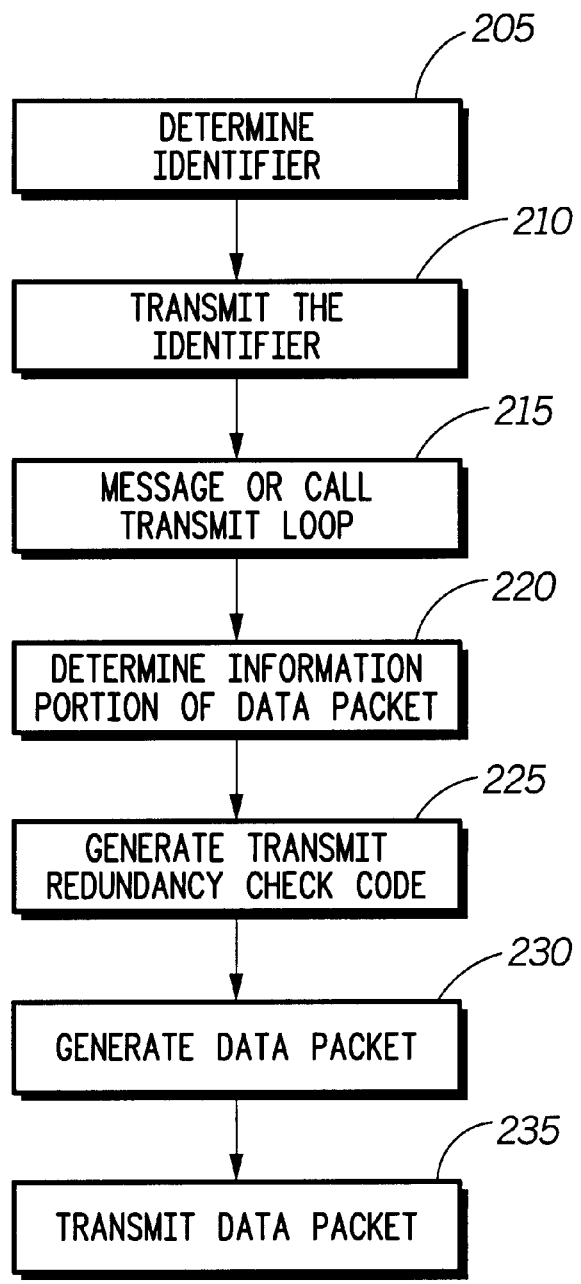
FIG. 2 shows a flow chart of a method used in a first of the two data terminals to encode and transmit a data packet, in accordance with the preferred and five alternative embodiments of the present invention.
Figure 3:
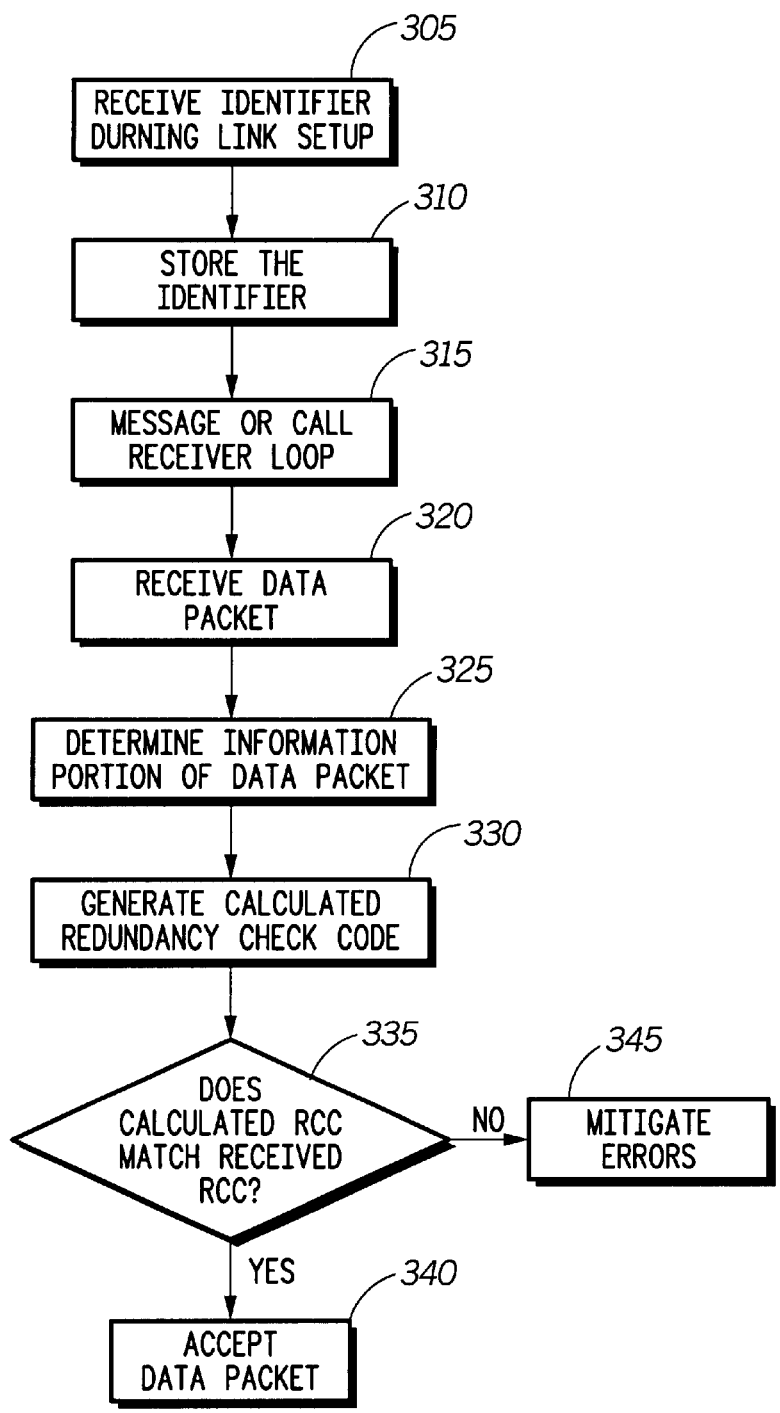
FIG. 3 shows a flow chart of a method used in a second of the two data terminals to receive and decode a data packet, in accordance with the preferred and five alternative embodiments of the present invention.

Referring to FIGS. 2 and 3 a flow chart of a technique used for communicating a data packet in a frequency hopping system is shown, in accordance with the preferred embodiment of the present invention. FIG. 2 shows steps relevant to encoding and transmitting a data packet transmitted in one frequency hop performed in the first data terminal 110 by the processor 122 under control of the program instruction segments in program memory 124. The data packet is part of a data message. At step 205, an identifier of a link is determined during a setup of the link between the first terminal 110 and the second terminal 160. The identifier is preferably an identity of the first terminal 110, but, alternatively can be an identity of the second terminal 160, and alternatively can be an identity of the link between the first terminal 110 and the second terminal 160 that is independent of the identity of the first terminal 110 and second terminal 160, and alternatively can be a combination of any two or all three of three aforementioned identities. Depending on which identity is used as the identifier, the identifier is either transmitted by the first data terminal 110 to the second data terminal 160, or vice versa, during the setup. The identifier is preferably unique within the universe of any terminals or links that could cause interference with the second terminal 160. A random number from a large enough range of numbers can be sufficiently reliable for the purpose of the link identity. At step 210, in accordance with the preferred embodiment of the present invention, the first terminal 110 transmits the identifier for reception by the second terminal 160. At step 215, a loop is setup in which data packets of the messages or calls are encoded and transmitted. The remaining steps in FIG. 2 are the steps to encode and transmit one data packet.

At step 220, an information portion of the data message that is small enough to be included in one data packet is determined. The information portion is preferably a next unsent portion of the message or call, having N or fewer characters or digital words, wherein N is the number of characters or digital words that are transmitted in each packet. At step 225, a transmit redundancy check code is generated over the information portion determined at step 220 and the identifier of the link being used to communicate the present data packet. "Generating over" means that a binary logic function (a redundancy check code generator) that generates the redundancy check code is used to transform a combination of the information portion and the identifier of the link, the combination being one wherein the bits of the information portion and the identifier of the link are merged into one binary value. The transmit redundancy check code is generated using a predetermined redundancy check code generator that is preferably a conventional redundancy check code generator that generates a redundancy check code such as the cyclic redundancy check code known as CRC-16 to those of ordinary skill in the art. This is defined by the generator polynomial: $g(x)=1+x^2+x^{15}+x^{16}$. Other redundancy check codes can be used equally well.

At step 230, the data packet is generated, comprising the information portion and the redundancy check code, without the identifier. Preferably, the information portion is transmitted first and the transmit redundancy check character is transmitted second, but the opposite order or interlacing can be used equally well. At step 235, the data packet is transmitted.

FIG. 3 shows steps relevant to receiving and decoding the data packet transmitted in one frequency hop, performed in the second data terminal 160 by the processor 122 under control of the program instruction segments in program memory 174. At step 305, the identifier of the link is received during the setup of the link between the first terminal 110 and the second terminal 160. At step 310 the second terminal stores the identifier. As described above with reference to FIG. 2, the identifier is alternatively transmitted from the second data terminal 160 to the first data terminal 110 during the setup of the link. At step 315, a loop is setup in which data packets of the messages are received and decoded. The remaining steps in FIG. 2 are the steps to receive and decode one data packet.

At step 320, the data packet is received, including a received information portion and a received redundancy check code. The received information portion and a received redundancy check code are identical to the respective portions transmitted by the first terminal 110, but for errors induced by interference or distortion of the link. At step 325, the received information portion of the data packet is determined. At step 330, the same redundancy check code generator used to generate the transmit redundancy check code in the first terminal is used to generate a calculated redundancy check code that is calculated over the received information portion determined at step 325 and the identifier of the link stored at step 310. When the calculated redundancy check code and received redundancy check code match at step 335, the data packet is accepted, at step 340, as error free and being from the expected source (the first terminal 110). When the calculated redundancy check code and received redundancy check code do not match at step 335, the data packet is rejected at step 345. In a real time voice communication system, the data packet is mitigated. In a data system, a retransmission of the data packet is requested by the receiving terminal.

It will be appreciated that the use of a redundancy check code as described herein in accordance with the preferred embodiment of the present invention provides the benefit of reliably verifying that a data packet is from a desired data terminal without adding any data bits to a data packet to accomplish the verification, and is therefore a highly desirable improvement to frequency hopping systems, particularly to uncoordinated real time frequency hopping systems. The technique also provides improvements in coordinated and non real time data communications systems

What is claimed is:

1. A method for decoding a data packet that is received in a link of a communication system, comprising in a receiving terminal the steps of:

determining an information portion and a received redundancy check code of the received data packet;

generating a calculated redundancy check code over the information portion and an identifier using a predetermined redundancy check code generator, wherein the identifier is at least one of an identity of the link and an identity of the receiving terminal; and rejecting the information portion when the received redundancy check code does not match the calculated redundancy check code.

2. The method according to claim 1, further comprising the steps of:

determining the identifier at a setup of the link; and communicating the identifier to a transmitting terminal during the setup, the transmitting terminal being a source of the data packet.

3. The method according to claim 1, further comprising the step of:

receiving the identifier from a transmitting terminal during a setup of the link, the transmitting terminal being a source of the data packet.

4. The method according to claim 1, wherein the identifier is a combination of the identity of the receiving terminal and the identity of the link.

5. The method according to claim 4, wherein the identifier is a combination of the identity of the receiving terminal, the identity of the link, and an identity of a transmitting terminal, the transmitting terminal being a source of the data packet.

6. The method according to claim 1, further comprising the step of transmitting the data packet.

7. The method according to claim 1, wherein the step of generating a calculated redundancy check code comprises the step of:

using a cyclic redundancy check code generator.

8. The method according to claim 1, wherein the link is a link in a frequency hopping communication system.

9. A data terminal that decodes a data packet that is received in a link of a communication system, comprising:

a processor; and a memory programmed with program instructions that control the processor for:

determining an information portion and a received redundancy check code of the received data packet;

generating a calculated redundancy check code over the information portion and an identifier using a predetermined redundancy check code generator, wherein the identifier is at least one of an identity of the link and an identity of the data terminal; and rejecting the information portion when the received redundancy check code does not match the calculated redundancy check code.

10. The data terminal according to claim 9, wherein the identifier is a combination of the identity of the data terminal and the identity of the link.

11. The data terminal according to claim 10, wherein the identifier is a combination of the identity of the data terminal, the identity of the link, and an identity of a source terminal, the source terminal being a source of the data packet.

12. A method for decoding a data packet that is received in a link of a communication system, comprising in a receiving terminal the steps of:

determining an information portion and a received redundancy check code of the received data packet;

generating a calculated redundancy check code over the information portion and an identifier using a predetermined redundancy check code generator, wherein the identifier is a combination of an identity of the receiving terminal and an identity of a transmitting terminal, and wherein the transmitting terminal is a source of the data packet; and rejecting the information portion when the received redundancy check code does not match the calculated redundancy check code.

13. The method according to claim 12, wherein the identifier is a combination of the identity of the receiving terminal, the identity of the transmitting terminal, and an identity of the link.

* * * * *